Jan. 2, 1940.  W. F. FRASER  2,185,843
WATCHMAKER'S POISING TOOL
Filed Dec. 23, 1937
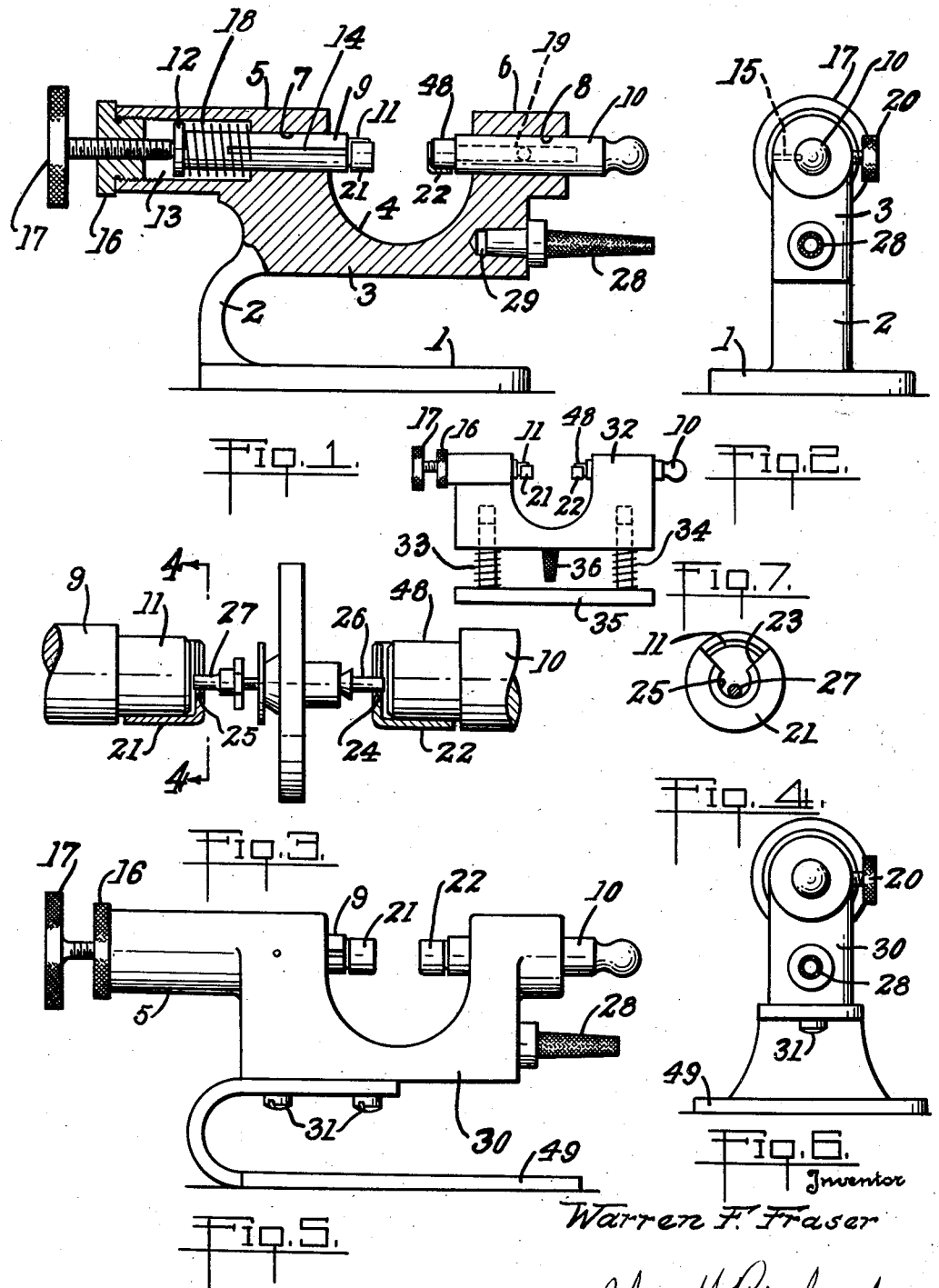
Inventor
Warren F. Fraser
Chas. H. Richards
Attorney Patented Jan. 2, 1940

2,185,843

UNITED STATES PATENT OFFICE 2,185,843

WATCHMAKER'S POISING TOOL

Warren F. Fraser, Westboro, Mass.

Application December 23, 1937, Serial No. 181,390

8 Claims. (Cl. 73—51)

The present invention relates to tools used by watchmakers to test the balance assembly of a watch in order to insure that its center of gravity coincides with its pivotal axis.

The present device most commonly used for testing the poise of a balance assembly is in the nature of a pair of calipers held in the hand during the testing operation. This type of device is almost universal in use and is depended upon to secure the accuracy necessary to maintain a watch in close running condition regardless of the position of the pendent but it has been noticed that the poise obtained has not been so accurate as has been desired for very fine timekeepers. There is another type of device which is used by some clock and watch makers which consists of a pair of parallel knife edges that rest on a bench or other support in a perfectly level plane. The use of this type of a device enables the operator to poise a balance assembly more accurately than when using the caliper type but due to fact that the process is extremely slow it is only used occasionally.

It is accordingly an object of the present invention to provide a device which can be placed on a solid support whereby it will be held stable and not affected by conditions such as exist when using a hand tool and yet is simple to set up and use.

In the caliper type of poising tools it is necessary to adjust the tool for each balance assembly regardless of whether the assembly is of the same or of a different size. This adjustment requires a great deal of skill in order to duplicate the exact conditions for each balance assembly tested and is dependent on a person's judgment as to whether the conditions are the same in each case. It is another object of the present invention to provide an adjustable poising tool which can be used for testing the poise of any number of balance assemblies of the same size without the necessity of individual adjustments and yet can be adjusted for various sizes of assemblies as required.

In using the parallel knife edges it is necessary to be sure that they are in positive parallel relation with each other and in a level plane. This gives a static balance to the balance assembly but it is a very difficult and tedious operation to perform.

It is a further object of the present invention to test a balance assembly for poise by means of a solidly supported poising tool in which vibratory impulses can be set up.

Other and ancillary objects and advantages will be apparent from the following detailed description taken in connection with the following drawing in which—

Fig. 1 is a side elevation, partially in section, of the tool of the invention.

Fig. 2 is an end elevation of Fig. 1.

Fig. 3 is an enlarged view of a balance assembly mounted in position to be poised.

Fig. 4 is a view taken on line 4—4 of Fig. 3.

Fig. 5 is a modification of the invention.

Fig. 6 is an end view of Fig. 5.

Fig. 7 is a modification of the invention.

Like reference characters refer to like parts in the different figures.

The poising tool shown is intended for use by watch and clock makers and adjusters and is constructed in such a manner that anyone having knowledge of the requirements necessary to assure accurate poise in balance assemblies can readily set the said tool to suit the assembly at hand and bring it into poise very readily.

With reference to Fig. 1 the invention comprises a base or foot 1 having a resilient pedestal 2 which supports a body 3. The body 3 has an opening 4 to provide clearance for the wheel of a balance assembly. On either side of the opening 4 are hubs 5 and 6 having bores 7 and 8 in which are slidably mounted runners 9 and 10.

Runner 9 has a reduced end portion 11 and an enlarged head portion 12, said head portion fitting in a bore 13 in the hub 5. A keyway 14 receives a pin 15 whereby the runner 9 is axially but not rotatably movable. The bore 13 is closed by a cap 16 which is screw threaded therein. The cap 16 is internally threaded to receive an adjusting screw 17 the end of which abuts the head 12 of the plunger 9. A spring 18 surrounds the runner 9, one end abutting the bottom of the bore 13 and the other end abutting the underside of the head 12, and urges it to the left to hold it against the end of the screw 17.

The runner 10 has a reduced portion 48 and a flattened surface 19 against which the end of a screw 20, Fig. 2, is forced to hold the said runner in adjusted position. A pair of caps 21 and 22 having openings 23, Figs. 1, 3 and 4, are made to be a friction fit on the reduced ends 11 and 48 of the runners 9 and 10 whereby they can be adjusted lengthwise. The caps 21 and 22 also have arcuate knife edges 24 and 25 on which are placed the ends 26 and 27 of the balance assembly staff.

Due to the fact that the weight of a balance assembly is very small in amount the surface friction between the ends 26 and 27 and the knife edges 24 and 25 is enough to prevent accurate poising of the said assembly by pure static balancing and, therefore, vibration is used to cause the assembly to move so that its heavy side moves to the bottom. The preferred construction of the tool as shown in the drawing, Figs. 1 and 5, is in the nature of a tuning fork in which one prong is used for a supporting base and the other prong used for transmitting vibratory impulses, the two prongs being connected by a resilient portion at one end, although it is possible to mount a body on a pair of coil springs as shown in Fig. 7. It is also possible to construct the body member to have a flat upper surface with the runners raised high enough to provide clearance for the balance wheel without the necessity of having a clearance provided. In order to provide the proper amount of vibration to the poising tool a knurled member 28, Fig. 1, is fitted in a bore 29 provided in the body 3. By stroking the knurled member 28 with any instrument having a sharp corner or another knurled member, such as a round file, vibrations in a vertical plane are set up due to the resiliency of the pedestal 2. These vibrations are sufficient to cause the balance assembly to raise off of the knife edges 24 and 25 just enough to permit the said assembly to rotate if it is out of poise. When an assembly is in poise it will stay in any position it is placed regardless of the vibrations imparted to the tool.

By having the openings 23 in the caps 21 and 22 it is possible to place the balance assembly staff ends 26 and 27 on the knife edges without disturbing the axial setting of the runners 9 and 10.

Figs. 5 and 6 show a modified construction of the invention wherein the base 49 is separate from the body 30 and is fastened thereto by means of screws 31.

The modification shown in Fig. 7 provides for mounting a body 32 on the upper end of a pair of springs 33, 34 which are secured to said body in any suitable manner such as soldering. The lower ends of the said springs are securely fastened to a base 35. A knurled member 36 is fastened to the bottom of the body 32 so that when the said member is stroked with a tool vibratory impulses will be set up in a vertical plane.

While the members 28 and 36 are preferably knurled they could be replaced with members having a serrated edge provided the serrations were fine enough to set up the proper vibrationary impulses.

When using the poising tool of this invention the arbor 10 is fastened in desired position by means of the clamping screw 20 and then the arbor 9 is adjusted by means of the screw 17 so that the ends 26 and 27 of the balance staff just clear the faces of the said arbors when the balance assembly is lowered through the openings 23, in the caps 21 and 22, onto the knife edges 24 and 25. With the balance assembly in position the knurled member 28 is stroked with a tool, such as a file, to set up vibrations in the tool so that the said assembly will gravitate so that its heavy side will be on the bottom. The assembly is removed from the knife edges and a correction made therein to bring the assembly into balance. This operation is repeated until the assembly can be placed in the tool with any part of the rim of the balance wheel at the bottom of the caps 21 and 22 and stay there without gravitation when the tool is vibrated. When this condition is reached the assembly is poised to a very high degree of accuracy and is capable of running in a watch very closely in all positions of the pendent.

I claim:

1. In a balance assembly poising tool having a base member, a body member having arcuate means to support the ends of a balance assembly, resilient means forming the sole connection between said members, and means attached to said body member whereby relative vibration in a vertical plane may be set up between said members.

2. In a balance assembly poising tool having a base member, a body member having arcuate means to support the ends of a balance assembly, resilient means forming the sole connection between said members at a point substantially to one side of the balance assembly supporting means, and means attached to said body member whereby relative vibration in a vertical plane may be set up between said members.

3. In a poising tool having a base member, a body member with arcuate knife edge supports for a balance assembly, resilient means forming the sole connection between said members at one end thereof, and means attached to said body member comprising a knurled member whereby relative vibration in a vertical plane can be set up between said members by stroking the knurled member.

4. In a poising tool having a base member, a body member, resilient means forming the sole connection between said members at one end thereof, opposed runners having arcuate supports to receive the ends of a balance staff in said body member, and means to relatively adjust said runners.

5. In a poising tool having a base member, a body member having an opening therein, resilient means connecting said members, opposed runners in said body member, and arcuate knife edged caps adjustably mounted on said runners.

6. In a poising tool having a base member, a body member having an opening therein, resilient means connecting said members, opposed runners in said body member, arcuate knife edged caps adjustably mounted on said runners, and means comprising a spring and screw for relatively adjusting said runners.

7. In a poising tool comprising a base member, a body member having an opening therein to receive a balance assembly, resilient means connecting said members, and opposed arcuate knife edges supported on said body member at each side of the opening and adapted to support the ends of the balance staff.

8. In a poising tool comprising a base member, a body member, resilient means forming the sole connection between said members at one end thereof, and opposed runners in said body member provided with arcuate knife edges.

WARREN F. FRASER.